United States Patent [19]

Lenne

[11] 4,031,776

[45] June 28, 1977

[54] CAMS SUITABLE FOR USE IN MOTION TRANSMITTING MECHANISM AND MOTION TRANSMITTING MECHANISM INCORPORATING SUCH CAMS

[75] Inventor: William Lenne, Gagny, France

[73] Assignee: Essilor International General d'Optique Cie, Joinville-le-Pont, France

[22] Filed: Mar. 31, 1975

[21] Appl. No.: 563,659

[30] Foreign Application Priority Data

Apr. 11, 1974  France ................................ 74.12725

[52] U.S. Cl. ............................................... 74/567
[51] Int. Cl.² ............................................. F16H 53/00
[58] Field of Search ............................. 74/567, 568

[56] References Cited

UNITED STATES PATENTS

| | | | |
|---|---|---|---|
| 1,104,637 | 7/1914 | Day et al. | 74/568 |
| 1,311,093 | 7/1919 | Scott | 74/568 |
| 1,464,589 | 8/1923 | Talbot | 74/568 |
| 1,524,461 | 1/1925 | Speer | 74/568 |
| 3,004,416 | 10/1961 | Haddad | 74/568 |

*Primary Examiner*—Samuel Scott
*Assistant Examiner*—Wesley S. Ratliff, Jr.
*Attorney, Agent, or Firm*—Young & Thompson

[57] ABSTRACT

A copying machine which can reproduce convex or concave surfaces having smaller radii of curvature at the edge than at the center, for example the surfaces of moulds for making contact lenses, has a cam assembly including a cam with a part-cylindrical cam surface mounted on a base. The cam has a part-circular section in the plane perpendicular to the cam surface generatrices and a straight section tangential to and continuous with one end of the part-circular section. The latter is slidably mounted on a concentric part-circular guide on the base, allowing rotary movement about its geometric center. The guide and at least the part-circular section of the cam have complementary square profiles. The part-circular cam section may be locked in position on the guide by screws threaded into the guide and passing through a concentric part-circular slot in the cam. The machine has a feeler held against the cam surface, a work block movable perpendicularly to the cam surface generatrices, and a transmission for moving the work block in dependence on the movement of the feeler. The transmission is so arranged that when the feeler moves away from an axis parallel to the cam surface generatrices passing through the geometric center of the part-circular cam section the work block moves towards that axis. The transmission includes a pivoted lever. The work block and feeler may be pivoted to this on the same or opposite sides of its pivot. In the first case a tool carried by the work block is located on the opposite side of the axis to the lever, while in the second case it is located between the axis and the lever.

8 Claims, 6 Drawing Figures

CAMS SUITABLE FOR USE IN MOTION TRANSMITTING MECHANISM AND MOTION TRANSMITTING MECHANISM INCORPORATING SUCH CAMS

BACKGROUND OF THE INVENTION

The present invention generally concerns motion transmitting mechanism for use in copying machines of the type having a cam with a cylindrical cam surface, a feeler held against the cam surface, a work block movable in translation perpendicularly to the generatrices of the cam surface, and a hydraulic, mechanical, pneumatic or other transmission for moving the work block in dependence on the movements of the feeler; most often the work block is a tool-carrying block and this is able to produce a surface homologous, in practice homothetic, to the surface of the cam directing it.

A problem encountered with such machines is ensuring rapid adaptation to the reproduction of different surfaces.

This is particularly so in the case of copying machines for producing aspherical surfaces such as those of the moulds for making contact lenses.

In fact, to provide moulds for making contact lenses with different geometrical characteristics it must be possible to modify the profile of the cam directing the copying machine used.

To this end it is possible to provide as many cams with different profiles as there are types of surface to be obtained, and to fit the copying machine with the cam corresponding to each type of surface.

As well as calling for the manufacture and storage of a large number of different cams, and thus being costly, this solution requires on each occasion a lengthy and delicate cam fitting operation, due to the adjustments which are necessary.

To reduce this inconvenience it has already been proposed to use cams with variable profiles or cam surfaces which can, with the appropriate adjustments, be adapted to the various types of surface to be obtained, as for example in U.S. Pat. No. 3,881,378.

But in practice variable profile cams of this type which are currently available, while being particularly useful for surfaces with radii of curvature at the periphery which are greater than that at the centre, do not allow surfaces to be produced having radii of curvature at the periphery which are less than that at the centre.

Such surfaces may be needed, however, particularly for producing moulds for making contact lenses for correcting strong myopeia, with a view to decreasing the thickness of such a lens at the edge.

SUMMARY OF THE INVENTION

The primary object of the invention is a cam permitting the production of such surfaces which is also adaptable, with great flexibility, to different surfaces of the same type; another object of the invention is a copying machine incorporating such a cam.

A cam in accordance with the invention is characterised in that it comprises a part-circular section in the plane perpendicular to the generatrices of its cam surface, hereinafter called the circular section, rotatably mounted on a base and continuous at one end with a straight section which tangentially extends the circular section.

When the feeler associated with such a cam follows its circular section the tool which it controls also describes a circular arc.

When the feeler then follows the straight section of a cam in accordance with the invention, provided that the transmission which links it to the tool which it controls is suitably set up, the tool follows a curve which, tangential to the preceding circular portion, moves away from the circle extending this portion by an amount which is related, for each radius of this circle, to that separating the straight section of the cam from the circle extending its circular section, because of the reproduction ratio of the transmission.

The curve then followed by the tool thus extends within the circle extending the circular arc initially followed by the tool.

It is thus possible to obtain a surface with a peripheral radius of curvature less than that at the centre, and to modify this radius of curvature it suffices to shift the cam by rotating it about the centre of its circular section.

Further, shifting the tool relative to the axis parallel to the generatrices of the cam surface of the cam in accordance with the invention which passes through the centre of the circular section of the latter enables the radius of curvature of the central area of the surface obtained to be modified conjointly or independently.

The cam in accordance with the invention is thus readily applicable to the production of surfaces with different characteristics, having radii of curvature at the periphery less than at the centre.

BRIEF DESCRIPTION OF THE DRAWINGS

The features and advantages of the invention will be apparent from the following description, given by way of example with reference to the accompanying diagrammatic drawings, in which.

DESCRIPTION OF A PREFERRED EMBODIMENT

Figure 1:
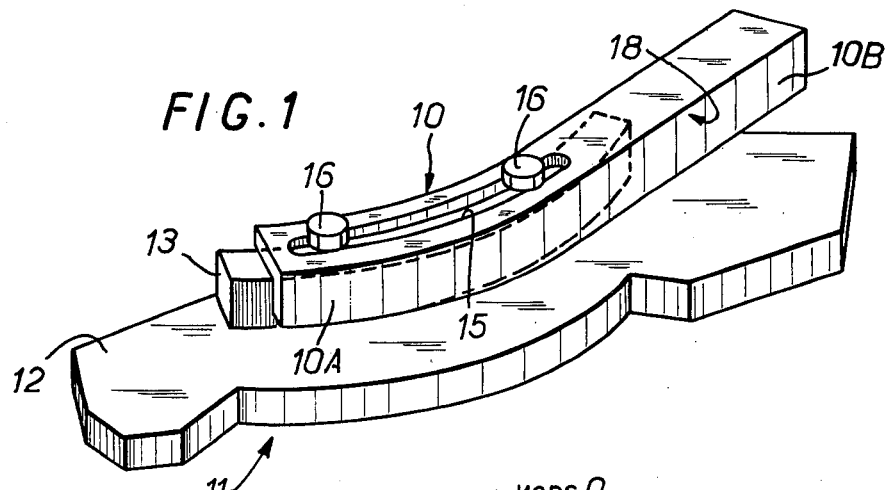
FIG. 1 is a perspective view of a cam in accordance with the invention.
Figure 2:
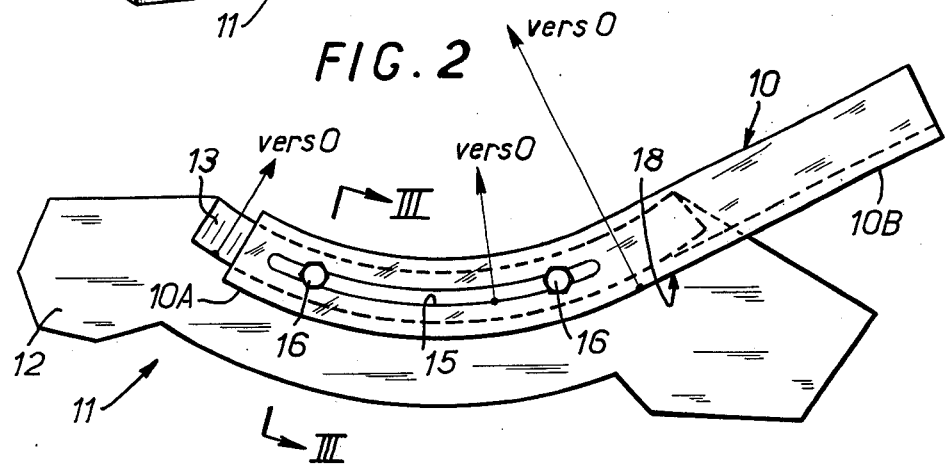
FIG. 2 is a plan view of the cam.

In the embodiment shown in the drawings, the cam 10 in accordance with the invention in mounted on a fixed base consisting of a bed plate 12 from one face of which projects a perpendicular flange 13 which extends along a circular arc.

In the example shown, this flange 13 provides a guide for the cam 10, centred at O and hereinafter called the circular guide.

Figure 3:
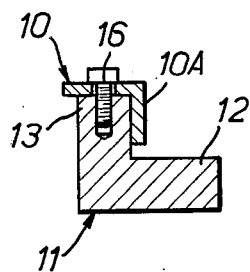
FIG. 3 is a transverse section on the line III—III in FIG. 2.

In cross section the circular guide has a substantially rectangular outline, as can be seen in FIG. 3 in particular.

In the embodiment shown, the cam 10 has a square transverse section, which is thus complementary to the profile of the circular guide 13, and is formed in a continuous piece, having a section 10A in the form of a circular arc, hereinafter called the circular section, and a straight section 10B extending the circular section 10A tangentially at one end.

The circular section 10A of the cam 10 has the same centre O as the circular guide 13 and is slidably mounted on the latter.

For clamping it in position on the circular guide 13 the circular section 10A of the cam 10 has a circular slot 15 with the same centre O as the circular guide 13, through which pass clamping elements in the form of screws 16 which are screwed into the circular guide 13.

The side surfaces of the sections 10A and 10B of the cam 10 form a continuous cylindrical cam surface 18, and strictly speaking it is where this cam surface is concerned that in the plane perpendicular to its generatrices the cam according to the invention must be considered to have continuous circular and straight sections.

Figure 4:
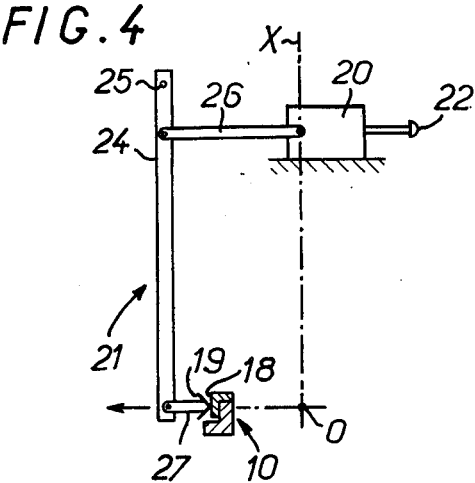
FIG. 4 is a diagrammatic sectional side elevation of a copying machine incorporating a cam in accordance with the invention.

FIG. 4 shows diagrammatically a copying machine which may be fitted with a cam in accordance with the invention.

Such a copying machine will not be described in detail here; it is sufficient to state that it has, in the usual manner, a feeler or follower pointer 19 held against the cam surface 18 of the cam 10, a work block 20 which is movable in translation perpendicularly to an axis X parallel to the generatrices of the cam surface 18 of the cam 10 which passes through the centre O of the circular section of the latter, and a transmission 21 which moves the work block 20 in dependence on the movement of the feeler 19.

In the example shown the work block 20 is a tool-carrying block which carries a tool 22.

According to the invention the transmission is so arranged that when the feeler 19 moves away from the axis X the tool 22 moves towards it.

In the example given in FIG. 4, which relates to the use of the invention for producing concave surfaces, the transmission 21 includes a lever 24 pivoted to the frame of the machine at 25; the feeler 19 and the work block 20 are coupled to this lever by respective links 26 and 27 which are both pivoted to the lever 24 on the same side of the pivot 25, and the tool 22 carried by the work block 20 is on the opposite side of the axis to the lever 24.

Figure 5:
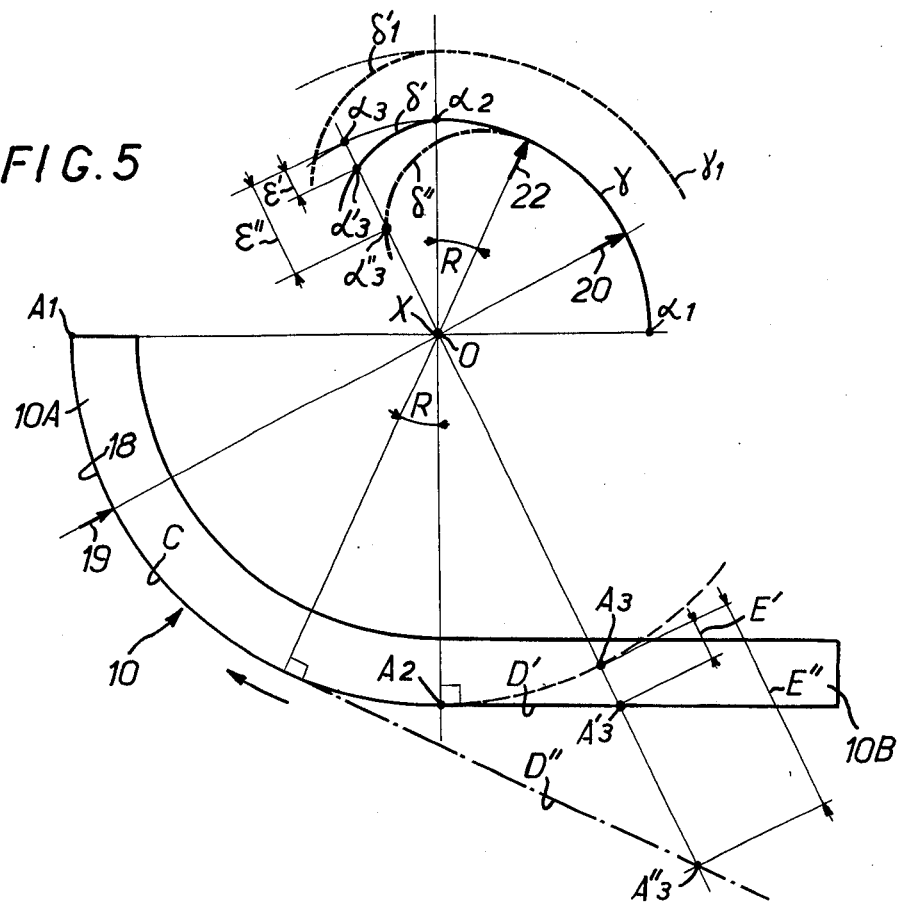
FIG. 5 is a plan view to a different scale showing the use of the cam.

Referring now to FIG. 5, which is a view of a plane perpendicular to the axis X defined above, the axis X is coincident with the centre O of the circular section 10A of the cam 10.

In FIG. 5 it has been supposed that the cam 10 is locked in position with its circular section 10A against the guide 13 on which it is mounted.

Let $R_1$ be the radius of that part of the cam surface 18 corresponding to the circular section 10A of the cam 10.

As the feeler 19 follows the section 10A it describes from point $A_1$ to point $A_2$ of the latter a circular arc C or radius $R_1$, and the tool 22 describes a circular arc $\gamma$ of radius $R_2$ from a point $\alpha_1$ on the line $OA_1$ to a point $\alpha_2$ on the line $OA_2$.

When the feeler 19 follows the straight section 10B from the point $A_2$ which marks the tangential union of the straight section 10B of the cam 10 with its circular section 10A, it describes a line D' and the tool 22 describes a curve $\delta'$ which unites tangentially with the circular arc $\gamma$ and each point $\alpha_3$ of which, for any radius $OA_3$ of the extended circle C is spaced from the corresponding point $\alpha_3$ of the extended circle $\gamma$ by a distance $\epsilon'$ proportional to the distance E' separating the point $A_3$ in question from the point $A'_3$ of the straight section of the cam surface 18 located on the radius $OA_3$, the proportionality between the distances $\epsilon'$ and E' corresponding to the reproduction ratio imposed by the transmission 21.

Thus the curve $\delta'$ moves towards the centre of the circle $\gamma$ initially followed by the tool 22 and so has a radius of curvature which overall is less than the radius $R_2$ of circle $\gamma$.

It will be seen that with the cam according to the invention it is possible to obtain curves which, connecting tangentially with a given circular arc, pass through any point $\alpha'_3$ within the corresponding circle.

If such a curve must have a still smaller radius of curvature, or if, in other words, the curve $\delta'$ is to be replaced with a curve $\delta''$ passing through a point $\alpha''_3$ which is even closer to the axis X or the centre O than the corresponding point $\alpha'_3$ (i.e. spaced from the corresponding point $\alpha_3$ by a distance $\epsilon''$ greater than the distance $\epsilon'$ separating the point $\alpha'_3$ from this point $\alpha_3$), it is sufficient to loosen the screws 16 and to swing the circular section 10A of the cam 10 about the centre O, the section sliding along the circular guide 13 with which it is engaged, until the point $A''_3$ of the radius $OA_3$ considered is spaced from the point $A_3$ by a distance $E''$ corresponding to the required distance $\epsilon''$; in the Figure R is the angle through which the cam 10 has then turned.

For a given position of the tool 22 with respect to the axis X, which determines the ratio between $R_2$ and $R_1$, it is thus very easy to obtain a wide range of curves all having at their ends radii of curvature less than the radius $R_2$ and, since the tool 22 is movable to either side of the curve it follows, a wide range of aspherical surfaces having peripheral radii of curvature less than those of their centres.

To modify the radius of curvature of the central areas it is sufficient to move the tool relative to the axis X as shown diagrammatically in dashed line in FIG. 5; the tool 22 first follows a circular arc $\gamma_1$, then a curve $\delta'_1$, $\delta'_2$, or any other curve, in the manner described above.

It will be evident that if the tool 22 is located between the lever 24 of the transmission 21 shown in FIG. 4 and the axis X passing through the centre of the circular section of the cam 10, it will produce a convex surface, rather than a concave surface as before; but when the feeler 19 follows the straight section of the cam 10 the tool 12 moves away from the axis X instead of moving towards it.

MODIFICATION

Figure 6:
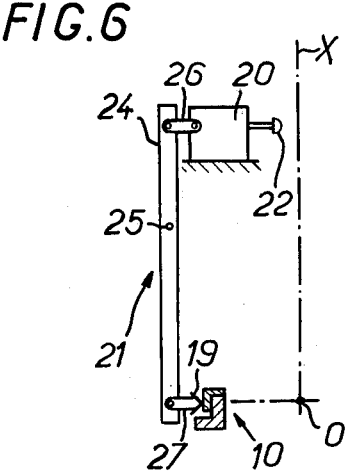
FIG. 6 is a view similar to FIG. 4 but relating to a modification.

In the modified embodiment shown in FIG. 6, the tool 22 is located between the axis X and the lever 24 of the transmission 21, but the pivot 25 of this lever is moved so that the links 26 and 27 coupling the work block 20 and the feeler 19, respectively, to the lever 24 are pivoted to the latter on opposite sides of the pivot 25 and not on the same side.

In this case the surface formed by the tool 22 is convex and when the feeler 19 follows the straight section of the cam 10 the tool 22 moves towards the axis X, as before, and so forms a surface which has at its periphery a radius of curvature which is less than that in its central region.

It will be understood that the present invention is not limited to the embodiments shown and described, but covers all equivalent modes of execution, particualrly where the mounting of the cam on the base is concerned, and especially as regards the circular guide on which it is mounted, as well as in relation to the work block which may carry the workpiece instead of the tool.

I claim:

1. A motion transmitting mechanism comprising a cam assembly comprising a fixed base, a rigid one-piece cam member having a generally J-shaped cam surface including a part circular portion and a planar portion tangent to and continuous with said part circular portion, and means adjustably mounting said cam member on said base for angular displacement about the axis of the said part circular portion, a feeler, means for maintaining said feeler in contact with said cam surface, a work block mounted for translatory movement perpendicular to said cam surface, and motion transmitting means connecting said work block to said feeler for transmitting movement, said motion transmitting means transforming movements of said feeler away from said axis of the part-circular cam surface into movements of the work block toward said axis, and vice versa.

2. A motion transmitting mechanism according to claim 1, and a pivoted lever, said work block being pivotally connected to same side of the pivot of the pivoted lever as the feeler, and said work block being adapted to carry a tool located on the side of said axis opposite said lever.

3. A motion transmitting mechanism according to claim 1, and a pivoted lever, said work block being pivotally connected to the side of the feeler opposite the pivotal mounting of said pivoted lever, and said work block being adapted to carry a tool located between said axis and said lever.

4. A motion transmitting mechanism according to claim 1, wherein said cam member is of generally J-shaped configuration.

5. A motion transmitting mechanism according to claim 1, wherein said base has a part-circular guide on which the part-circular portion of said cam member is received for angular displacements.

6. A motion transmitting mechanism according to claim 5, wherein the radial cross-section of the cam member is right-angular and the guide on the base is of complementarily quadrangular cross-section.

7. A motion transmitting mechanism according to claim 5, wherein said means adjustably mounting said cam member comprises fastening means for fixing said cam member relative to said guide, and wherein said part-circular portion of said cam member is provided with a part-circular slot for receiving said fastening means.

8. A motion trasmitting mechanism according to claim 7, wherein said fastening means comprises at least one screw.

* * * * *